July 31, 1956

R. A. BOHLMAN ET AL 2,756,563

ELECTROHYDRAULIC MOTOR MECHANISM

Filed Aug. 7, 1951

INVENTORS
RAY A. BOHLMAN
IVAN C. BOHLMAN

BY
Cook and Schermerhorn
ATTORNEYS

July 31, 1956 R. A. BOHLMAN ET AL 2,756,563
ELECTROHYDRAULIC MOTOR MECHANISM
Filed Aug. 7, 1951 4 Sheets-Sheet 2

INVENTORS
RAY A. BOHLMAN
IVAN C. BOHLMAN
BY Cook and Schermerhorn
ATTORNEYS

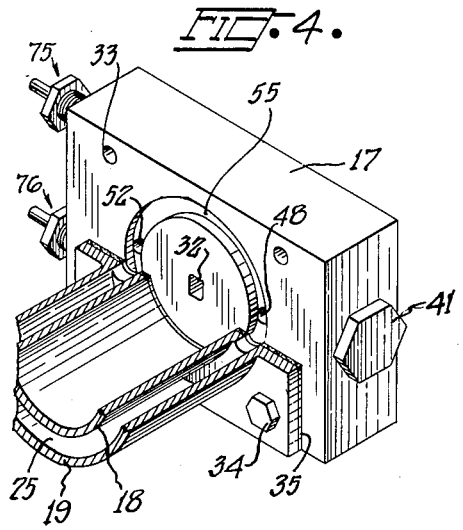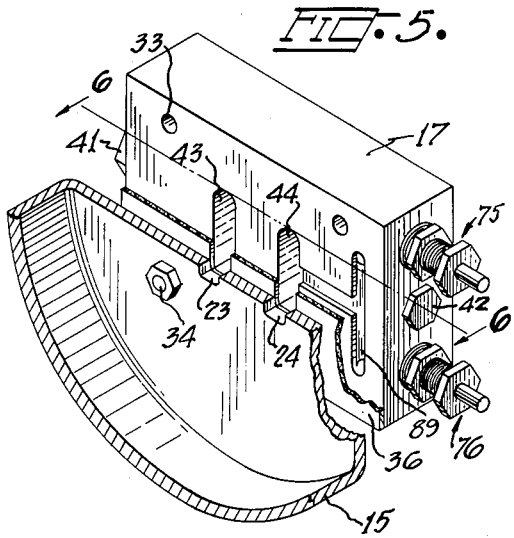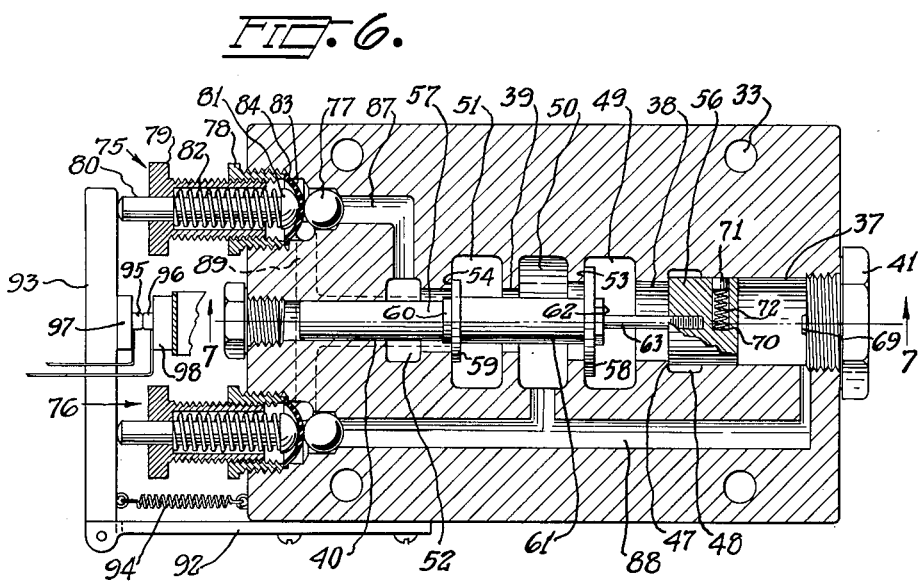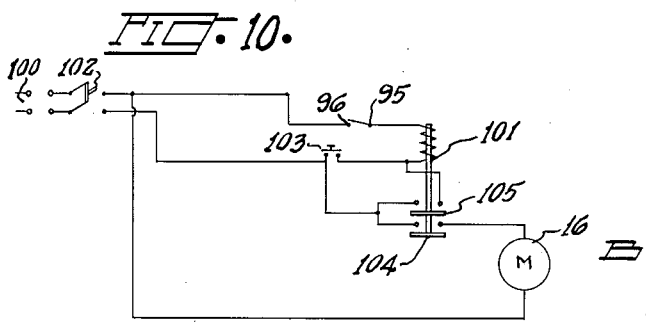

July 31, 1956 R. A. BOHLMAN ET AL 2,756,563
ELECTROHYDRAULIC MOTOR MECHANISM
Filed Aug. 7, 1951 4 Sheets-Sheet 4
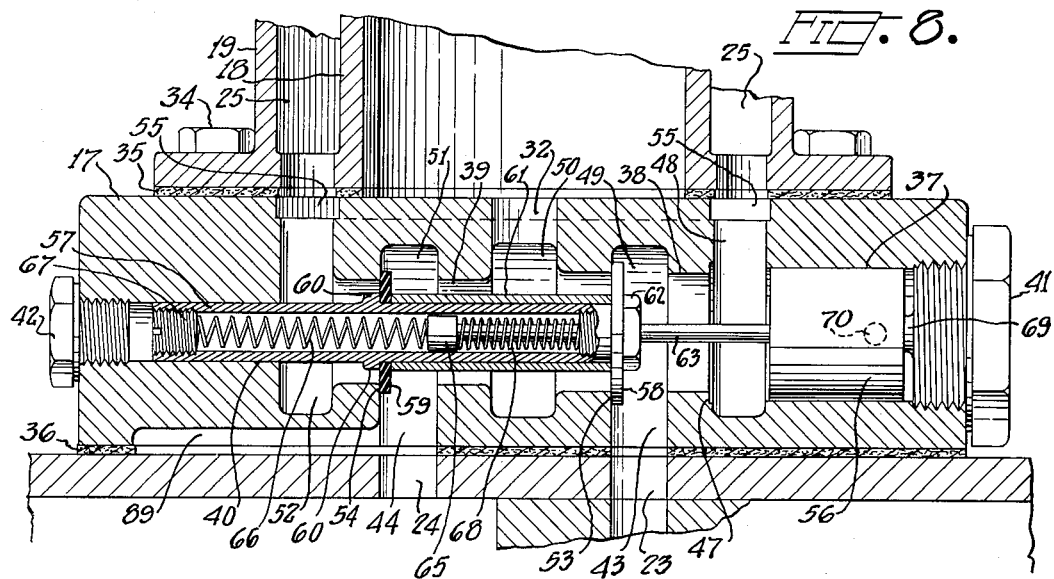
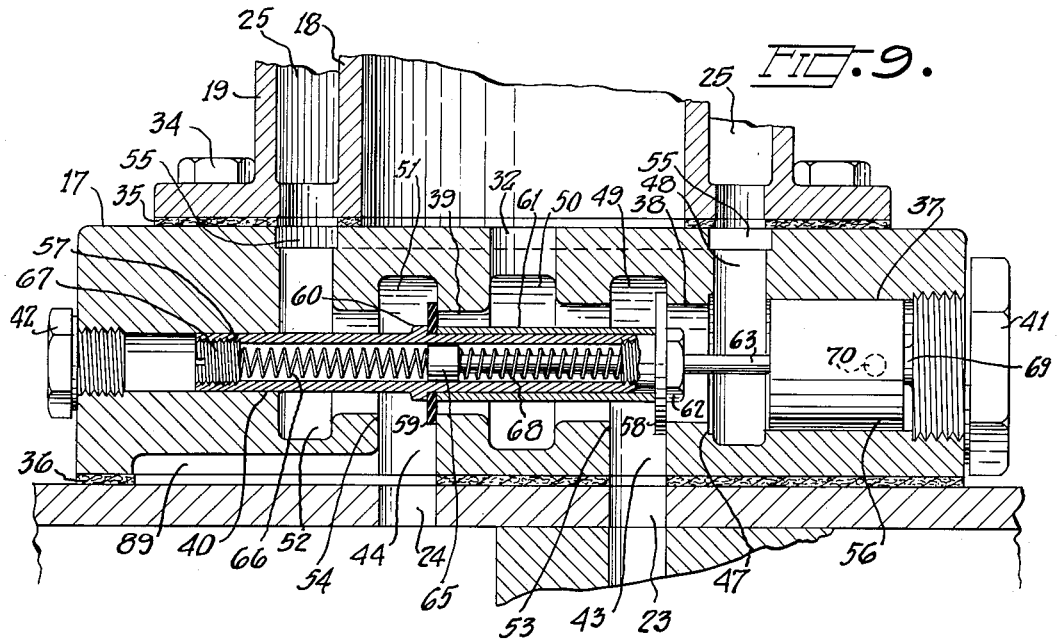
INVENTORS
RAY A. BOHLMAN
IVAN C. BOHLMAN
BY Cook and Schermerhorn
ATTORNEYS United States Patent Office 2,756,563
Patented July 31, 1956

2,756,563

ELECTROHYDRAULIC MOTOR MECHANISM

Ray A. Bohlman and Ivan C. Bohlman,
Walla Walla, Wash.

Application August 7, 1951, Serial No. 240,674

19 Claims. (Cl. 60—52)

This invention relates to an electro-hydraulic motor mechanism which is especially applicable for opening and closing doors and the like.

A principal object of the invention is to provide an electro-hydraulic mechanism for producing a reciprocating motion to open or close closure members such as garage doors, and for other purposes.

Another object is to provide a valve in the mechanism which will stop the electric driving motor and movement of the door and reverse itself for the next operation when the door encounters an obstruction or reaches its limit of travel.

Another object is to provide a fluid cylinder for said mechanism having a surrounding jacket which serves as a passageway for fluid as well as a protective shell for the inner piston-containing cylinder.

Another object is to provide adjustable means to maintain a predetermined minimum operating fluid pressure in the system.

Another object is to provide a latch to secure a door closed so that it cannot be pushed open and to automatically release the door when it is actuated by the electro-hydraulic mechanism.

Other objects are to provide a door-opening mechanism which is easily installed, which is rugged and reliable in operation, and which is relatively compact and simple to manufacture.

The present invention comprises a rugged closure operating mechanism provided with an electric motor connected to an hydraulic pump mounted in a housing which constitutes a reservoir. The pump supplies fluid under pressure through a port in the reservoir housing to a valve which regulates the flow of fluid to a cylinder. The cylinder is provided with a surrounding jacket and contains a piston which is attached to the door, or other device to be operated, by an elongated piston rod. The piston rod is reciprocated by fluid entering the cylinder under pressure of the hydraulic pump, the passage between the jacket and the cylinder providing a fluid flow passage. A port is provided in the cylinder wall adjacent the outer end to establish communication between the cylinder and its outer passageway, the flow of fluid through said port being restricted by an adjustable plug.

The apparatus includes a valve device designed to deliver fluid under pressure directly into one end of the cylinder or to an outer annular passageway communicating with the cylinder jacket, depending upon the prior operation. The valve device is preferably mounted between the pump and operating cylinder and has a longitudinal bore and transverse bores to provide communication between the pump outlet and inlet and the opposite ends of the cylinder. Telescoping valve stems carry valves and a floating valve guide, the valves being arranged to seat on shoulders in the longitudinal bore, and the valve stems being spring controlled to operate the valves and control the direction of fluid flow. Pressure relief valves are provided and operate in conjunction with electrical contact means to stop the motor and the pump when the pressure in the system becomes great enough, as when the end of travel is reached by the door, and also if movement of the door is obstructed. When the motor is stopped the valve will reverse itself so that, when the electric motor is again energized, the piston will move in a reverse direction.

The invention will be better understood and additional objects and advantages will become apparent from the following description taken in connection with the accompanying drawings, which illustrate a preferred form of the device. It is to be understood, however, that the invention may take other forms, and that all such modifications and variations, within the scope of the appended claims, which will occur to persons skilled in the art, are included in the invention.

In the drawings:

Figure 4 is a perspective view of the front of the valve removed from the reservoir and showing a portion of the cylinder in section;

Figure 5 is a perspective view of the rear side of the valve showing a portion of the reservoir in section;

Figure 6 is a sectional view of the valve mechanism taken on the line 6—6 of Figure 5;

Figures 7–9 are sectional views of the valve mechanism, taken on line 7—7 of Figure 6, showing different positions of the valve guide and valves;

Figure 10 is a wiring diagram of the electrical control circuit;

Figure 1:
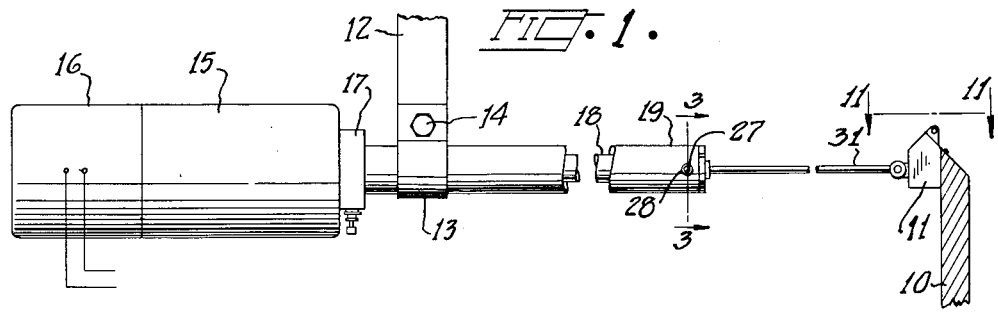
Figure 1 is a general side elevation view of a preferred embodiment of the invention.

The door operating mechanism disclosed in the drawings is adaptable to the opening and closing of most types of doors, such as garage doors, whether the door is mounted to swing vertically or horizontally, or whether the door rolls on tracks or slides in channels. The invention can also be applied to any number of other and different uses. The mechanism is preferably mounted as a single unit, obviating fluid supply pipes and extensive gear mechanisms or linkages.

Figure 2:
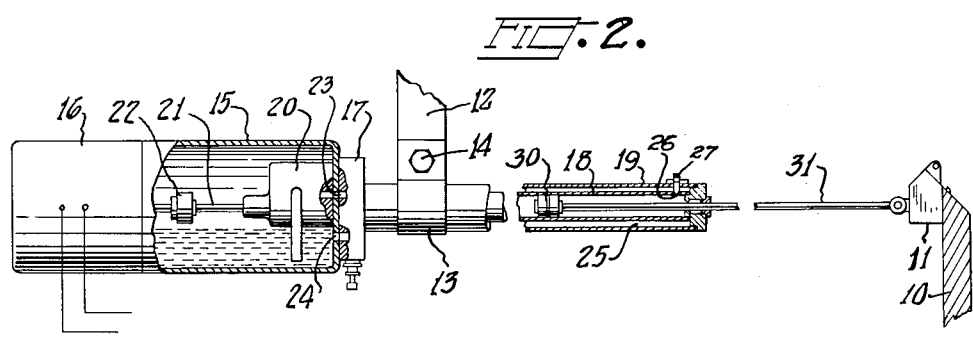
Figure 2 is a view similar to Figure 1 with parts in section showing the reservoir and cylinder construction.
Figure 7:
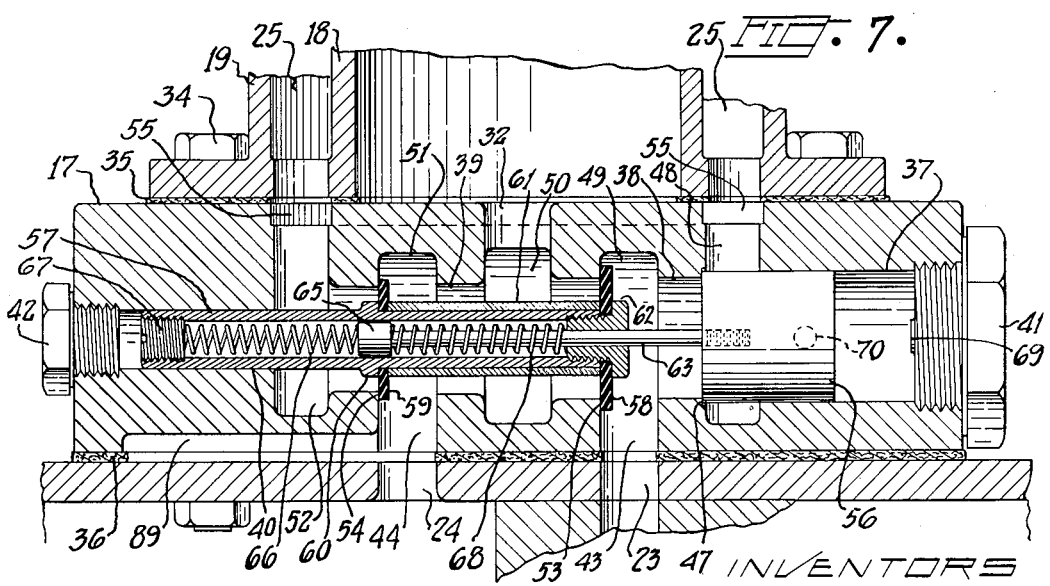

In Figures 1 and 2, the top edge of the door moves to the left in opening and to the right in closing. The door is mounted in a conventional manner, not shown, to swing vertically on horizontal pivotal supports, or it may be mounted to travel on curved tracks, and in any case it is preferably provided with a latch 11 to connect with the operating mechanism. The door actuating mechanism may be suspended from the ceiling or mounted on a wall for different types of doors, depending on the direction of movement of the door. The device, as shown, is suspended by a rigid bar 12 and a bracket 13. The bracket 13 grips the device and is pivotally mounted on the bar 12 by a pivot pin 14, allowing the bracket and the door actuating mechanism to pivot as the door moves.

The door-actuating mechanism comprises, in general, a reservoir 15, an electric motor 16, a valve mechanism 17, and a cylinder 18 having an outer jacket 19. Mounted within the reservoir 15 is an hydraulic pump 20 connected to the electric motor 16 by a drive shaft 21 and universal joint 22. The interior of the reservoir is partially filled with fluid, such as a suitable oil, and has a port 23 communicating with the valve mechanism 17 and a port 24 for returning fluid to the reservoir. The pump supplies fluid under pressure through the port 23 to the valve mechanism 17 which controls the direction of flow of fluid to the opposite ends of the cylinder. The motor 16 and pump 20 operate in the same direction in each operation.

Figure 3:
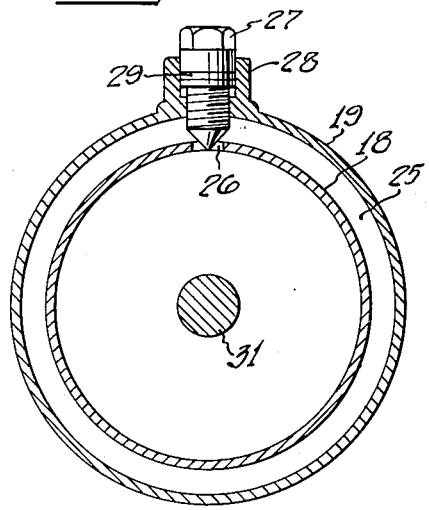
Figure 3 is a sectional view showing the arrangement of the plug to restrict the flow of fluid, taken on the line 3—3 of Figure 1.

The construction of the cylinder 18 with its surrounding jacket 19 provides an annular passageway 25, as shown in Figure 2. The passageway 25 communicates with the cylinder by means of a port 26 through the cylinder wall provided adjacent the outer end of the cylinder. The port 26 may be throttled to restrict the flow of fluid by a plug 27 which extends through the surrounding jacket 19 opposite the port as shown in Figure 3. The plug 27 is carried in a threaded bushing 28 on the outer wall of the jacket 19, the bushing being welded or otherwise secured to said jacket. A sealing ring 29 fits in a groove in the plug 27 and prevents liquid under pressure from escaping through the interior of the bushing. With the use of the plug thus described, the fluid flow through the port 26 can be controlled, also permitting adjustment to maintain a predetermined minimum fluid pressure in the system greater than the pressure necessarily required to move the door. Port 26 has been rotated into the plane of the view in Figure 2 to make the principle of operation apparent to the eye.

A piston 30 carries a piston rod 31 pivotally connected to the bracket 11 of the door 10. Fluid under pressure admitted to the inner end of the cylinder through port 32 in Figure 4 will force the piston 30 to the right as viewed in Figure 2, the fluid behind the piston 30 discharging into the passageway 25 through port 26, through the valve 17, and back into the reservoir through port 24. To move the piston to the left, fluid is introduced under pressure through passageway 25 into the outer end of the cylinder through port 26. The fluid thus displaced from the inner end of the cylinder is then discharged into the reservoir through the valve and port 24.

The outer jacket 19 surrounding the cylinder also serves the purpose of providing a protective shell for the cylinder. The device is thus able to withstand severe blows and rough usage without impairing the travel of the piston in the cylinder, and the deformation of the jacket 19 would have to be quite severe before the inner cylinder wall would be damaged and before the fluid flow in the passageway 25 would be restricted.

Figures 4 and 5 show, respectively, the front and rear sides of the valve housing 17. The valve housing is provided with holes 33 by which it is bolted to the cylinder and reservoir by bolts 34. Suitable gaskets 35 and 36 are placed on each side of the valve to effect a fluid-tight seal with the cylinder and reservoir.

Referring now to Figures 6–9, the valve housing has a central bore which is large at the upper end and diminishes into smaller bores at the lower end, forming chambers of different diameters. These chambers are designated by the numerals 37, 38, 39 and 40, the uppermost chamber being plugged by a screw-threaded plug 41 and the lowermost chamber being plugged by a screw-threaded plug 42. The housing has inlet passage 43 which communicates with the outlet port 23 of the reservoir and pump. A discharge passage 44 communicates with the inlet port 24 of the reservoir.

The different diameters of the bores 37 and 38 form a shoulder 47 which serves as a valve guide seat. The device is also provided with auxiliary chambers 48, 49, 50, 51 and 52 of larger diameter than the bores 38 and 39 also to form shoulders 53 and 54 serving as valve seats. The chambers 48 and 52 are in communication with each other by means of an annular passage 55 provided on the face of the valve housing, as seen in Figure 4.

Within the valve housing 17 and slidable in the cylindrical bore 37 is a floating valve guide 56 which is made in the form of a piston. Slidable in the bore 40 and guided thereby is a hollow valve stem 57 carrying resilient valve discs 58 and 59. The valve members 58 and 59 have central holes and are fixedly secured around the valve stem. The lower valve 59 is held firmly against an enlarged shoulder portion 60 by a sleeve 61. The upper valve 58 is clamped against the other end of sleeve 61 by a shouldered bushing 62 screw threaded into the hollow valve stem. The two valves 58 and 59 are thus held firmly at a predetermined distance apart so that they seat simultaneously on the respective shoulders or seats 53 or 54.

A guide rod 63 extends through a central bore 64 in the bushing 62 and telescopes within the hollow stem 57. The upper end of rod 63 has screw threaded engagement with the floating valve guide 56 so that it will move with the guide 56 as a piston rod. The rod is provided with a head 65 on its other end which engages a compression spring 66 mounted in the lower end of the hollow valve stem. The spring 66 seats against end plug 67 of the stem. Another compression spring 68 is mounted around the rod 63 and seats against the head 65 and bushing 62. The rod 63 and guide 56 are thus spring connected to valve stem 57 to serve as valve biasing means for changing the position of the valve member under certain conditions.

As best seen in Figure 6, the valve guide 56 has a transverse bore 70 in which is slidably mounted a friction bearing or plunger 71 urged outwardly by a compression spring 72. The friction means in said guide is to resist the movement of the guide and to hold the guide from changing its position by the action of the two springs 66 and 68. In other words, the friction of the plunger 71 exerted against the wall of the bore 37 is sufficient to hold the guide in a set position against compression of spring 68 in the position of the guide, for example, as shown in Figure 8. A projection 69 is formed on the inside surface of plug 41 to limit the movement of the guide 56 toward the plug so that there is always some space between the plug and guide for the admission of fluid pressure to return the guide to its Figure 7 position, as will be presently explained.

Referring now to Figure 6, the valve housing 17 is provided with pressure relief valves 75 and 76. Each of the pressure relief valves is of the same construction and contains a spring seated ball valve 77. A bushing 78 is screw threaded into a tapped bore and is also provided with internal screw threads to receive a threaded guide 79. A stem 80 extends through a central bore in the guide 79 and has a head 81 on one end which is urged toward the ball 77 under pressure of a spring 82. A flexible diaphragm 83 is provided between the head 81 and the ball 77. In the formation of the bore for the pressure relief valves, a shoulder 84 is formed. The rim of the diaphragm is clamped against this shoulder by the bottom edge of bushing 78 to insure a fluid-tight seal.

A passage 87 establishes communication between chamber 52 and the under side of ball 77 in pressure relief valve 75. Another passage 88 establishes communication between chamber 50, the upper bore 37, and the under side of ball 77 in pressure relief valve 76. A transverse passage 89, also shown in Figure 5, is a pressure relief discharge passage extending between the small cavities under the diaphragms of the two pressure relief valves and communicates with passage 44 to discharge fluid escaping through the relief valves into the reservoir.

A plate 92 secured to the housing pivotally supports a transverse bar 93 on the pressure relief valve end of the valve housing. The bar 93 rests on the ends of stems 80 and is held firmly thereagainst by a tension spring 94. A pair of suitable insulated contacts 95 and 96 are positioned between the bar 93 and the valve housing, the contact 95 being secured to a mounting plate 97 on the bar, and the contact 96 being secured to a mounting plate 98 on the valve housing. These two contacts establish a closed electrical circuit to the motor 16 when in closed position as shown in Figure 6. When these two contacts are separated by the action of one or the other of pressure relief valves 75 or 76, the electric motor is deenergized.

The complete electrical circuit is shown in the wiring diagram of Figure 10. A suitable source of power is designated by the numeral 100 for operating the motor 16 and relay 101. The relay circuit includes a main switch 102 and a push button switch 103. When the mechanism is at rest and in condition for operation, the contacts 95 and 96 are closed as well as the main switch 102. Then, to start the motor in operation, the push button switch 103 is closed. Relay 101 is energized and completes the power circuit for the motor through switch member 104. Switch member 105 maintains a holding circuit for the relay after push button switch 103 is released to open position. The motor circuit then remains closed until contacts 95 and 96 are separated to deenergize the relay and open the circuit.

To explain further the novel structure and function of the door closing mechanism, the operation thereof will be explained in detail. Assuming the valve mechanism to be in the position shown in Figures 6 and 7 with the door closed, the main switch 102 and the push button switch 103 are closed to energize the relay 101 and the motor 16 to open the door. The contacts 95 and 96 are also closed as shown in Figure 6, this being the normal position for these contacts. The motor 16 now operating actuates the pump 20, whereupon fluid under pressure enters through port 23 and inlet passage 43 to the chamber 49. The fluid pressure firmly seats the valve 58 against shoulder 53 and pushes the guide 56 to the right against the friction of plunger 71 to the position shown in Figure 8. The movement of guide 56 is limited by projection 69 on the plug 41.

As seen in Figure 8, the only path for the fluid pumped into chamber 49 is out through the chamber 48. This chamber communicates with annular passage 55 which in turn communicates with the annular passage 25 around cylinder 18. Fluid thus enters the passage 25 and the outer end of cylinder 18 through port 26. Hydraulic pressure is applied to the piston 30 and moves it to the left as viewed in Figure 2 to open the door. Fluid displaced by the piston from the left end of the cylinder discharges through the chamber 50, Figure 8, into chamber 51, out through passage 44 and into the port 24 of the reservoir 15.

As hereinbefore stated, the valves 58 and 59 are both securely fixed to the stem 57 and are spaced so as to seat simultaneously on the shoulders or seats 53 and 54, respectively. Fluid thus returning through chamber 51 has only one means of escape and that is into the passage 44, as described. Fluid which enters the chamber 52 under pressure does not unseat the valves because the area exposed to pressure on the under surface of valve 59 is smaller than the area of contact on the upper surface of valve 58. The force exerted on valve 58 plus the force of spring 66, to hold the valves seated in their Figure 8 position, is superior to the combined lifting forces of spring 68 and fluid pressure in chamber 52.

The device then stays in operation with the piston 30 moving to the left in Figure 2 until an obstruction is encountered by the door. The obstruction may be the end of travel of the door, or it may be an object in the path of the door. When the door stops, and will go no farther, the motor 16 continues to operate, building up pressure in the system, including the chamber 52 and the duct 87 to pressure relief valve 75. After sufficient pressure is built up, fluid in the duct 87, Figure 6, will unseat the ball 77, moving the stem 80 to the left which engages the bar 93. Movement of the bar by stem 80 separates the contacts 95 and 96 to deenergize relay 101 opening switch 105 and deenergizing the motor 16. Fluid escaping past the pressure relief valve will discharge into passage 89 and return to the reservoir through passage 44 and port 24.

During this phase of operation, the floating guide 56 being forced to the right in the bore 37 and held securely in this position by fluid pressure and friction means 71, the spring 68 is compressed, Figure 8. After the motor and pump are no longer in operation, the fluid pressure is reduced by fluid flowing back through the pump, the pump being of a type to permit such back flow when it is not operating. The friction means 71 is sufficient to resist the thrust of spring 68, and, therefore, the guide 56 stays in its Figure 8 position and the stem 57 is moved toward the guide by spring 68 when fluid under pressure no longer exerts a force against the upper surface of valve 58. The stem and valves thus assume the position shown in Figure 9, the valves 58 and 59 seating against the upper edges of bores 38 and 39, respectively.

In the next cycle, Figure 9, to close the door, the push button switch 103 is closed, and fluid under pressure enters the chamber 49 through port 23. The valve 58 being in its right-hand position, fluid enters the chamber 49 from passage 43, and thence enters chamber 50. The action of the two springs 66 and 68 on the stem is approximately neutral. Fluid under pressure thus is delivered directly into the cylinder 18 from chamber 50 through port 32 and moves the piston 30 to the right in Figure 2. The fluid pressure is also communicated through duct 88 to bore 37, shifting guide 56 back against its seat 47. This compresses spring 66 but does not move valve stem 57 because the area of valve disc 58 exposed to fluid pressure in chamber 49 is greater than the area of valve disc 59 which is exposed to fluid pressure in chamber 39. Fluid displaced from the right end of the cylinder 18 by the piston escapes through port 26 into passage 25, annular passage 55, chamber 52 and thence to port 24 in the reservoir.

The piston and rod will continue to move to the right until the movement is stopped by an obstruction or the closing of the door. When the piston stops, increased pressure is built up in the system, including the duct 88. The duct 88 communicates with the pressure relief valve 76 and bore 37, Figure 6, and when the pressure is sufficiently great, the ball 77 of pressure relief valve 76 moves the stem 80 to the left to move bar 93 and open the contacts 95 and 96. The motor is deenergized and the pressure is again equalized in the system by back flow through the pump. The valve stem 57, under action of the spring 66, moves to the Figure 7 position, seating the valves for the next cycle.

When the device is installed on a door the plug 27 may be backed away from the port 26 and disregarded if the mechanism operates satisfactorily. However, it will be appreciated that the shifting of guide 56 from its Figure 9 position back to its Figure 7 position requires the development of a certain minimum fluid pressure in chamber 50 and duct 88. If the closing movement of the door is very free and easy there may not be sufficient fluid pressure developed to shift the guide 56. In this event the plug 27 may be screwed up closer to the port 26 to throttle the flow therethrough, thereby retarding the movement of piston 30 sufficiently to insure adequate fluid pressure in chamber 50 and duct 88 to shift the guide 56 to the left in preparation for the next door opening operation. Port 26 must not, however, be throttled to the extent of developing a pressure which would unseat the balls 77 and open switch 95, 96, while the piston is moving in normal operation.

The pressure relief valves 75 and 76 are adjustable so that the pressure to unseat the ball valves 77 may be varied. This is accomplished by adjustment of the guide 79. As shown in Figure 6, the guide 79 is screwed deeply into bushing 78 to require a relatively high fluid pressure on the ball 77 to unseat it. This view is only illustrative, however, and, in operation, the guide 79 would be screwed into bushing 78 at a predetermined position so that adjustment may be accomplished either to increase or decrease the pressure on ball 77. If the device is to be used for opening and closing a small door or a light door, the guide 79 would be screwed into the bushing 78 so as to require very little pressure to unseat the ball valve 77. Conversely, the guide 79 would be screwed deeper into the bushing 78 if the device were applied to a heavy door.

Figure 11:
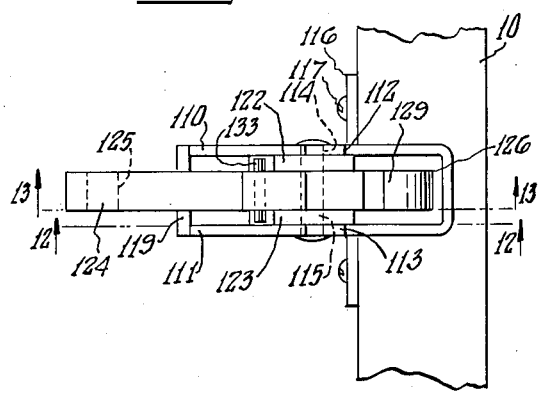
Figure 11 is a view of the latch showing its position relative to the door edge; taken on the line 11—11 of Figure 1.
Figure 12:
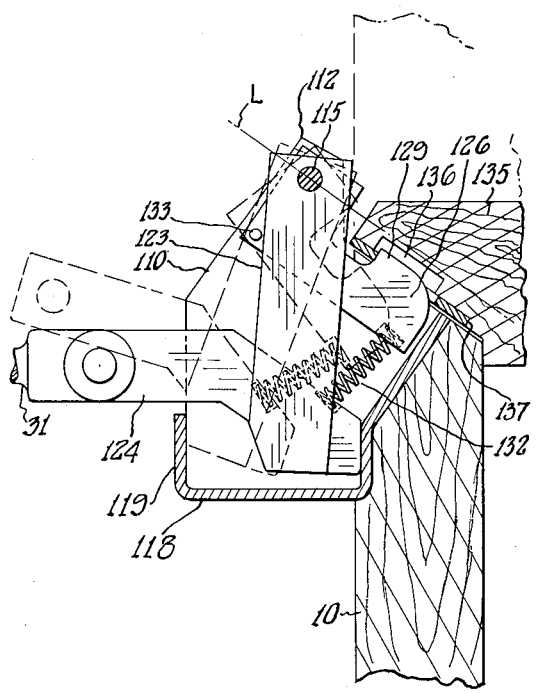
Figure 12 is a sectional view of the latch taken on the line 12—12 of Figure 11.
Figure 13:
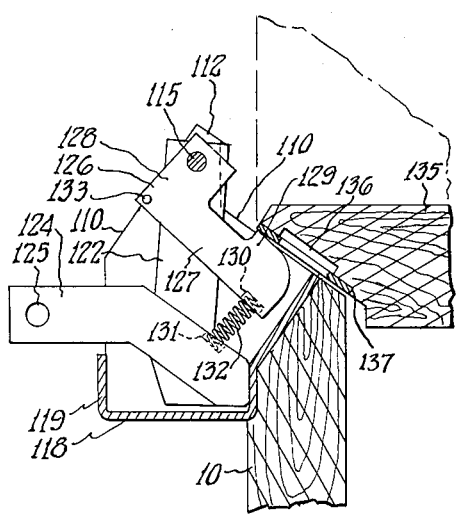
Figure 13 is a sectional view of the latch about to engage a latch plate in the door frame in the closing movement of the door, taken on the line 13—13 of Figure 11.

The latch 11 is shown in detail in Figures 11–13. Utilizing the type of pump of the present mechanism, whereby fluid pressure in the system is relieved by the fluid flowing back through the pump and into the reservoir when the pump is not operating, it is necessary that the door be provided with a latch which will hold the door shut because the door could be opened manually by exerting only sufficient energy as to move the piston in the cylinder. For this purpose, the latch 11 comprises a housing having a pair of side walls 110 and 111 each having an ear 112 and 113, respectively. The ears 112 and 113 have an aperture 114 to receive a pin 115 therebetween. One end of said housing comprises a plate 116 extending beyond the side walls and having two or more apertures therein to receive screws 117 for mounting the latch on the door 10. The housing has a bottom wall 118 and a short front wall 119, leaving a greater portion of one end of the housing open.

A pair of arms 122 and 123 is provided with apertures adjacent one end whereby the arms are pivotally mounted on the pin 115 extending between the side walls of the housing. The arms 122 and 123 are integrally secured to a bar 124 which extends through the open end of the housing and has an aperture 125 on its outward end so that the bar can be pin connected to the piston rod 31 as shown in Figures 1 and 2. It is thus seen that the arms 122 and 123 and the bar 124 act as an integral unit and pivot on the pin 115. As seen in Figures 12 and 13, the arms are secured to the bar at an angle and therefore end portions of the arms extend below the bar and abut against the inner surface of the short front wall 119 when the piston rod pulls the bar to the left. The left-hand position of the pivoting members is shown in dotted lines in Figure 12, and the other limit of pivotation or the right-hand position is shown in full lines in Figures 12 and 13 wherein the bar 124 abuts against the plate 116 when the piston rod is pushing the door closed.

Mounted between the arms 122 and 123 is a catch member 126 comprising a body portion 127, an ear 128, and a nose portion 129, best seen in Figure 13. The ear has an aperture to receive the pin 115 for pivotal movement of the catch member relative to the arms 122 and 123. The bottom edge of the catch 126 has a shallow bore 130 and the top edge of the bar 124 also has a shallow bore 131 so that the ends of a compression spring 132 can be seated in the bores to constantly urge the catch 126 and bar 124 apart. The catch member has a stop pin 133 securely mounted therethrough adjacent the lower edge, the pin 133 being slightly longer than the thickness of the catch, Figure 11, so as to extend behind and engage the rear walls of the arms 122 and 123 to limit the upward rotation of the catch caused by the pressure exerted by spring 132.

Figure 13 shows the door almost closed in relation to a member of the door frame 135. The frame has a recess 136 for receiving the nose portion 129 of the catch when the door is closed tight. It is seen that as the door is pushed closed by the piston rod and moves into the frame, the nose 129 is engaged by the latch plate 137 on the edge of the frame and pivoted under the compression of spring 132, whereby when the door is in closed position, the nose 129 will snap into the recess 136 and engage behind the latch plate to hold the door closed.

It is to be noted that the nose 129 of the catch is disposed in an off-set position relative to the line of movement of pin 115. As viewed in Figure 12 the top edge of the nose 129 is below the line of movement L passing through the center of the pivot pin 115. Thus, when the nose 129 engages the recess 136 and latch plate 137 of the door frame, the door cannot be pushed open, to the left, because pressure exerted on the door will tend to rotate the nose 129 farther into the recess rather than allowing it to slip out of the recess. The nose of the catch is further held in the recess by the force exerted by the spring 132. The bar 124 operates as a release member because when the piston rod begins its initial movement to open the door, the catch is automatically released as seen in dotted lines in Figure 12, the pin 133 on the catch being engaged by the arms 122 and 123 to pull the nose 129 from the recess in the door frame.

Having now described our invention and in what manner the same may be used, what we claim as new and desire to protect by Letters Patent is:

1. An electro-hydraulic unit comprising a reservoir, an hydraulic pump connected with said reservoir, an electric motor connected to and driving said pump, a valve housing connected with said pump, a cylinder, a surrounding jacket on said cylinder to provide a passageway for fluid to one end of the cylinder, a piston slidable in said cylinder, means responsive to fluid pressure in said valve housing to break the electrical circuit of said motor to stop the motor and said pump when movement of said piston is stopped, and means responsive to fluid pressure in said valve housing for reversing a flow of fluid in said cylinder and passageway in preparation for the next operation of the unit.

2. An electro-hydraulic unit comprising a reservoir, an hydraulic pump mounted in said reservoir, an electric motor connected to and driving said pump, a valve housing mounted on said reservoir, a cylinder mounted at one end on said valve housing, a jacket surrounding said cylinder to provide a passageway for fluid to the end of said cylinder remote from said valve housing, a piston slidable in said cylinder, fluid pressure actuated means in said valve housing to break the electrical circuit of said motor to stop the motor and pump, and means in said valve housing for reversing the path of fluid flow in said cylinder and passageway when said motor is deenergized.

3. An electro-hydraulic unit comprising an hydraulic pump, an electric motor for driving said pump, a cylinder, a piston in said cylinder, and a valve housing having a pressure chamber and a relief chamber, fluid pressure actuated means in said valve housing to break the electrical circuit of said motor to stop the motor and pump valves in said chambers to control the flow of fluid from said pump to opposite ends of said cylinder, and a fluid pressure responsive actuator connected to said valves to actuate the valves and reverse the path of fluid flow to said cylinder after each stroke of the piston and stopping of said pump.

4. An electro-hydraulic unit comprising a hydraulic pump adapted to rotate in only one direction, an electric motor for driving said pump, a cylinder, a jacket surrounding said cylinder forming a fluid passage, a piston in said cylinder, and a valve housing, said valve housing having a pressure chamber and a relief chamber, valves slidably mounted in said chambers to control the flow of fluid from said pump to said cylinder and passage surrounding said cylinder, and a friction controlled guide means spring-connected to said valves to reverse the position of the valves after each stroke of said piston to reverse the path of fluid flow to said cylinder and passage.

5. In an actuating mechanism, an electric motor, an hydraulic pump driven by said motor, a cylinder, a piston in said cylinder, a piston rod on said piston, a valve housing, means in said valve housing for controlling the flow of fluid from said pump to opposite ends of said cylinder, switch means actuated by fluid pressure in said mechanism to deenergize said electric motor when movement of said piston is obstructed, and means in said valve housing for reversing fluid connections to said cylinder when said motor is deenergized.

6. A control mechanism for connection between an electric motor driven hydraulic pump and a fluid pressure operated device, comprising a pressure chamber, a pressure relief valve having a valve stem extending outwardly from said chamber, a switch engaged by said stem to deenergize said motor when said valve is unseated, and a relief duct for removing relieved fluid from said valve when said valve is unseated.

7. A valve housing having a pressure port and a relief port, passages in said housing for communication with a fluid pressure operated device, a bore establishing communication between said pressure port and relief port and said passages, a pair of valves mounted on a common slidable valve stem in said bore for movement between two limit positions, said valves being constructed and arranged to be held by introduction of the working pressure of the fluid in the position assumed at the time of establishment of said working pressure, and a floating guide in said bore resiliently connected with said valve stem and movable by fluid pressure to a position biasing the valves to their other position and operable to shift the valves to said other position when said working pressure acting on the valves is reduced.

8. A valve housing having a pressure port and a relief port, passages in said housing for communication with a fluid pressure operated device, a bore establishing communication between said pressure port and relief port and said passages, pressure chambers extending from said bore, a pair of disc valves mounted on a common slidable valve stem in said bore and having different areas exposed to pressure in one of said chambers acting in opposition on said valves to hold said valves upon introduction of fluid pressure in the position assumed at the time of establishment of said pressure, and a floating guide in said bore spring-connected with said valve stem and movable by fluid pressure to a position biasing the valves to a different position and operable to shift the valves to said different position when said chamber pressure acting on the valves is reduced.

9. A valve housing having a pressure port and a relief port, passages in said housing adapted to communicate with a fluid pressure operated mechanism, a plurality of chambers establishing communication between said pressure and relief ports and said passages, a bore in said housing communicating with said chambers, a floating valve stem slidable in said bore, valves mounted on said stem for movement between two positions, a fluid pressure responsive floating guide slidable in said bore and connected to said valve stem through the medium of a pair of opposed springs, said valves in each of said positions directing fluid pressure to a side of said guide which will move said guide to bias said valves toward the other position and frictional anchor means in said guide to hold the guide in its actuated position in said bore to shift the valves to said other position when pressure is reduced in the system.

10. A valve housing having a pressure port and a relief port on one side of the housing, an hydraulic pump mounted on said one side of the housing in communication with said ports, fluid passages on the opposite side of said housing, a double acting jacketed cylinder mounted on said opposite side of the housing with one of said passages in communication with one end of the cylinder and another of said passages in communication with a space between said cylinder and jacket, a port in the other end of said cylinder in communication with said space, chambers in said housing establishing communication between said pressure and relief ports and said passages, valves in said chambers, said valves in one position directing fluid under pressure from said pump to said one end of said cylinder and in another position directing said fluid pressure through said space to said other end of said cylinder, means responsive to excessive fluid pressure to stop said pump, and a valve control member operable in response to the establishment of fluid pressure and the cessation of fluid pressure in sequence to shift said valves and direct the fluid pressure to opposite ends of said cylinder in successive operations of the cylinder.

11. In a reversing valve, a valve member movable to two operating positions and constructed and arranged to be maintained by the introduction of fluid pressure in whichever position it assumed at the time of imposition of fluid pressure, a fluid pressure actuated valve biasing member, a resilient connection between said valve member and biasing member, said valve member controlling the application of fluid pressure to said biasing member to bias the valve member toward its other operating position, and restraining means for holding said biasing member in actuated position against the influence of said resilient connection for shifting said valve member by the action of said resilient connection upon cessation of fluid pressure.

12. In a reversing valve, a valve member movable to two different operating positions and acted on by the introduction of fluid pressure to be held in the position it assumed at the time of imposition of said fluid pressure, a piston, a resilient connection between said piston and valve member, said valve member in each position directing said fluid pressure against a side of said piston to move the piston in a direction to bias the valve member toward its other position, and frictional means for holding said piston in different positions against the influence of said resilient connection, said resilient connection shifting said valve member to said other position upon cessation of said fluid pressure.

13. In a fluid pressure reversing valve, a disc valve member movable to two operating positions and having an area exposed to the introduction of fluid pressure to hold the valve member in the position it assumed at the time of imposition of said pressure, a fluid pressure actuated valve biasing member exposed to said pressure under the control of said valve member to bias the valve member toward its other position, frictional means for holding said biasing member in different positions, and a resilient connection between said valve member and biasing member, said frictional means exerting a holding force superior to the moving force of said resilient connection and inferior to the moving force of said fluid pressure, said resilient connection shifting said valve member to said other position upon cessation of said fluid pressure.

14. An actuating mechanism comprising a unitary assembly of motor driven fluid pump, reversing valve, cylinder and piston, said reversing valve being movable between two operating positions and constructed and arranged to be held by the introduction of fluid pressure in the position assumed at the time of said introduction of pressure, a valve control member operable by the working pressure of the pump to bias said valve toward its other operating position, a motor switch actuated by excessive working pressure to stop said pump, said valve control member being operable to shift sad valve to said other position upon cessation of said working pressure.

15. An actuating mechanism comprising a motor driven pump, reversing valve housing, cylinder and piston mounted in unitary assembly, pump discharge and inlet connections in said valve housing communicating with separate chambers in said housing, cylinder inlet and discharge connections communicating with additional separate chambers in said housing, a valve member mounted for movement to two different positions in said housing for reversing fluid connections between said pump and said cylinder, said valve member being constructed and arranged to be held by the introduction of fluid pressure in the one of said two positions occupied by the valve member at the time of said introduction of fluid pressure, a valve control member movable by said fluid pressure to bias the valve member toward the other of said two positions, and a motor switch operable by excessive fluid pressure to stop said pump, said valve control member being operable to shift said valve members to said other position upon cessation of said fluid pressure when the pump stops.

16. A reversing mechanism for a fluid pressure operated device comprising a reversing valve movable between two operating positions, said valve being constructed and arranged to be held by introduction of fluid pressure in the position assumed at the time of said introduction of fluid pressure, and a valve control member operable by said fluid pressure to bias said valve toward its other operating position and operable to shift said valve to said other position upon cessation of said fluid pressure, said valve resting in said two positions alternately between successive operations of the device.

17. A reversing mechanism for connection in a fluid circuit between a unidirectional pump and a reversible fluid pressure operated device comprising a reversing valve movable between two operating positions, said valve being constructed and arranged to be held by the introduction of fluid pressure in the position assumed at the time of said introduction of fluid pressure, a valve control member operable by said fluid pressure to bias said valve toward its other operating position, and pressure responsive pump control means arranged to be actuated by excessive working pressure to stop the pump and remove said working pressure, said valve control member being operable upon cessation of said working pressure to shift said valve to said other position.

18. An automatic reversing valve for a fluid pressure operated device comprising a housing, pump discharge and inlet connections communicating with separate chambers in said housing, inlet and discharge connections for said device communicating with additional separate chambers in said housing, a valve member mounted for movement to two different positions in said housing for reversing fluid connections between said pump connections and said device connections, said valve member being constructed and arranged to be held by the introduction of fluid pressure in the one of said two positions occupied by the valve member at the time of said introduction of fluid pressure, and a valve control member movable by said fluid pressure to bias the valve member toward the other of said two positions and operable to shift said valve member to said other positions upon cessation of said fluid pressure.

19. An automatic reversing valve for a pump operated fluid pressure actuated device comprising a housing having a bore, pump discharge and inlet connections communicating with separate chambers in said bore, inlet and discharge connections for said device communicating with additional separate chambers in said bore, a valve stem having a plurality of valve members mounted for movement to two different positions in said bore for reversing a fluid circuit between said pump connections and said device connections, said valve members being arranged to be held by the introduction of fluid pressure in the one of said two positions occupied by the valve members at the time of said introduction of fluid pressure, a valve control piston movable in said bore by said fluid pressure in a direction controlled by said valve members and resiliently connected to said valve stem to bias said valve members toward the other of said two positions, means to hold said piston in the position to which it is moved by said fluid pressure against the tension of said resilient connection, said resilient connection then shifting said valve members to said other position upon cessation of said fluid pressure.

References Cited in the file of this patent

UNITED STATES PATENTS

| | | |
|---|---|---|
| 784,644 | Warner | Mar. 14, 1905 |
| 1,251,833 | Straub | Jan. 1, 1918 |
| 1,417,430 | Tulloch et al. | May 23, 1922 |
| 1,545,170 | Schmitz | July 7, 1925 |
| 1,547,210 | Garrett | July 28, 1925 |
| 1,616,841 | Beebe | Feb. 8, 1927 |
| 1,770,912 | Clapp | July 27, 1930 |
| 1,910,766 | Hobson | May 23, 1933 |
| 1,954,813 | Harris | Apr. 17, 1934 |
| 1,986,206 | Kennedy | Jan. 1, 1935 |
| 1,989,248 | Scott | Jan. 29, 1935 |
| 2,001,233 | Anderberg | May 14, 1935 |
| 2,246,535 | Playfair | June 24, 1941 |
| 2,323,731 | Schetzline | July 6, 1943 |
| 2,391,551 | Cruzan | Dec. 25, 1945 |
| 2,457,467 | Hartman | Dec. 28, 1948 |
| 2,483,322 | Miller | Sept. 27, 1949 |
| 2,566,745 | Parsons | Sept. 4, 1951 |
| 2,586,682 | McLeod | Feb. 19, 1952 |
| 2,611,246 | Ackerman | Sept. 23, 1952 |
| 2,640,465 | McLeod | June 2, 1953 |
| 2,680,016 | McLeod | June 1, 1954 |